(No Model.)  3 Sheets—Sheet 1.
T. HAWLEY.
MECHANISM FOR JOINING PIECES OF RUBBER CLOTH.
No. 338,069.  Patented Mar. 16, 1886.
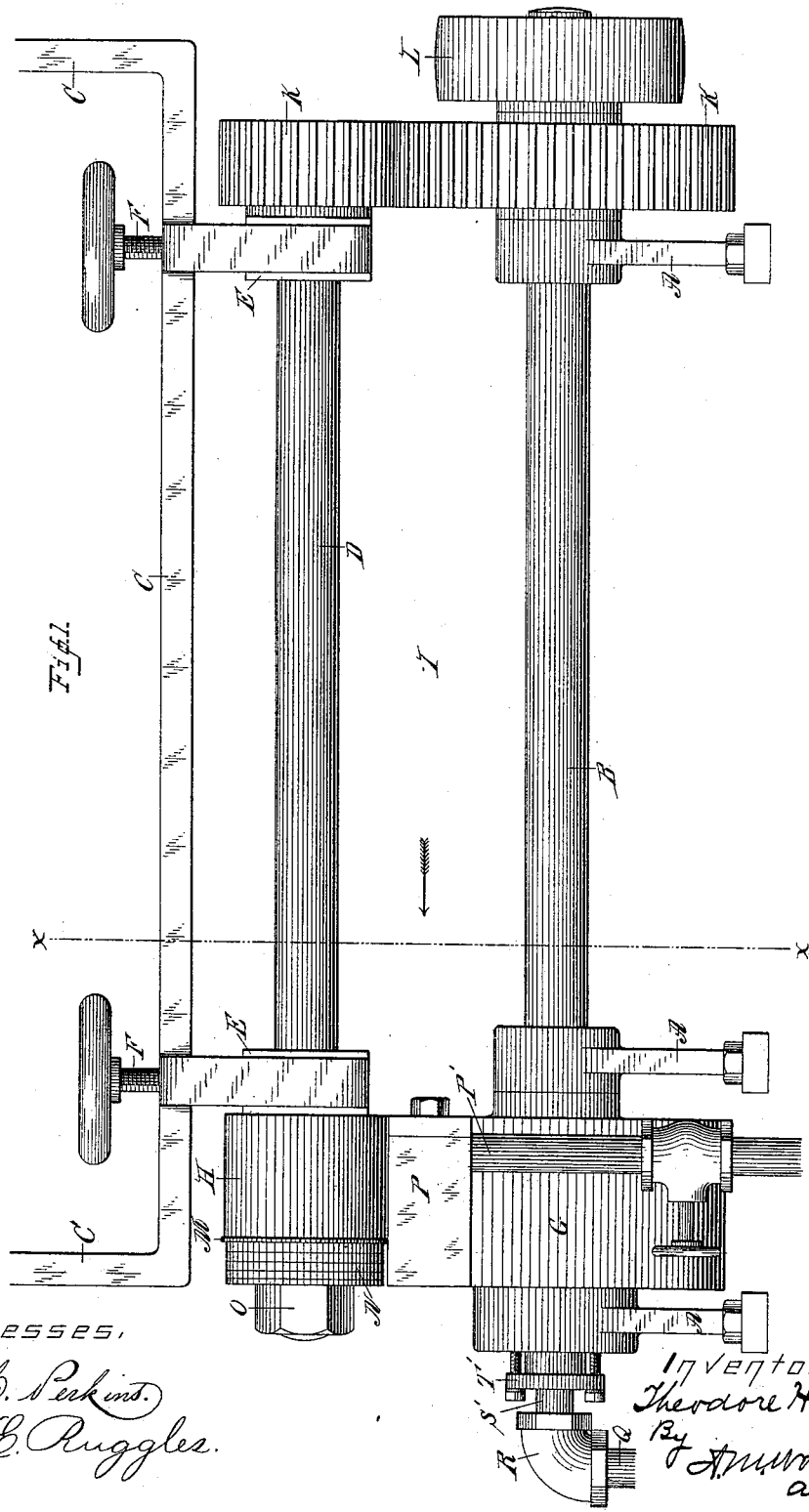
Witnesses:
E. E. Perkins
C. E. Ruggles.
Inventor:
Theodore Hawley
By H. M. Wooster
atty.

(No Model.) 3 Sheets—Sheet 2.
T. HAWLEY.
MECHANISM FOR JOINING PIECES OF RUBBER CLOTH.
No. 338,069. Patented Mar. 16, 1886.
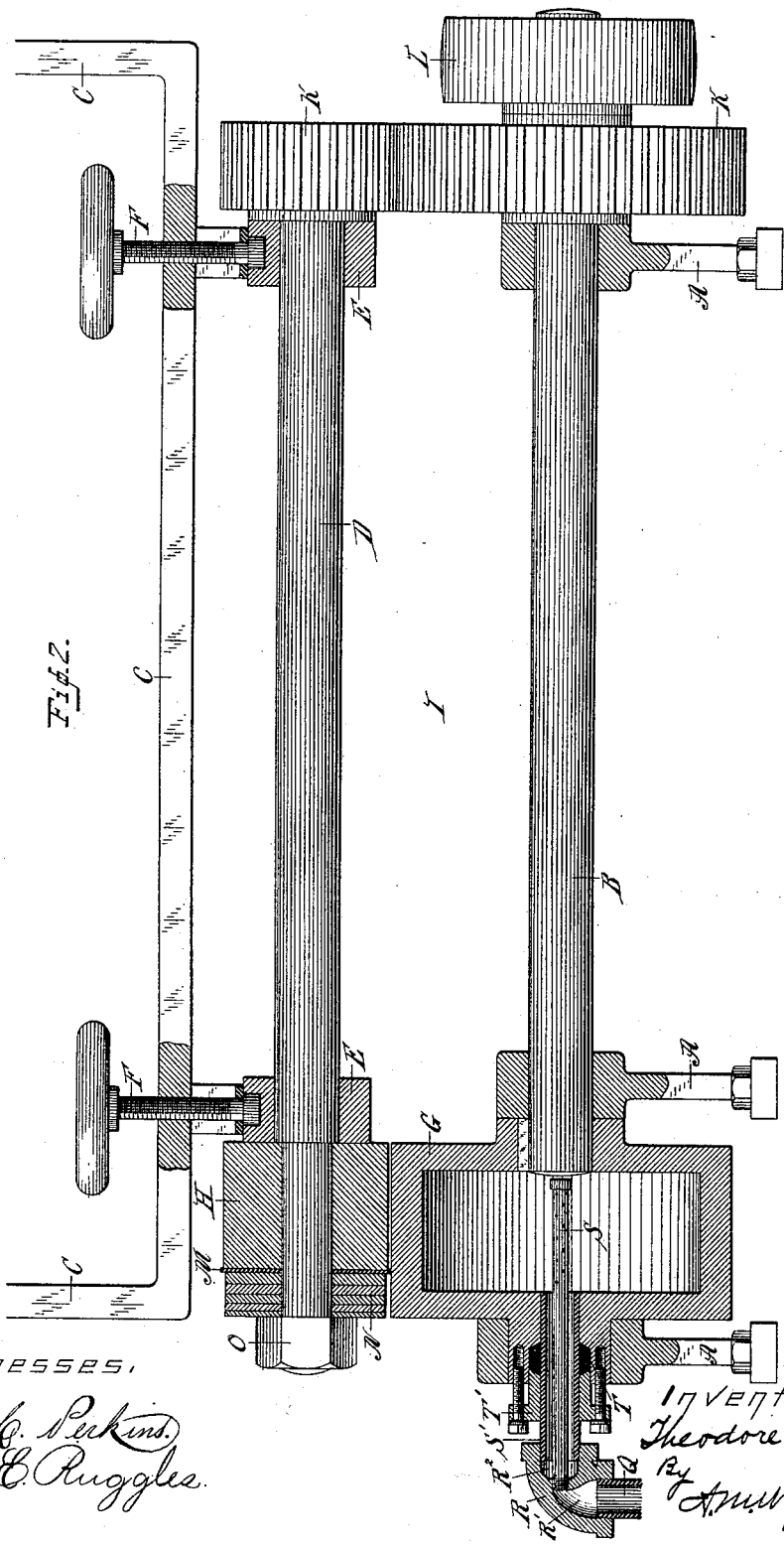

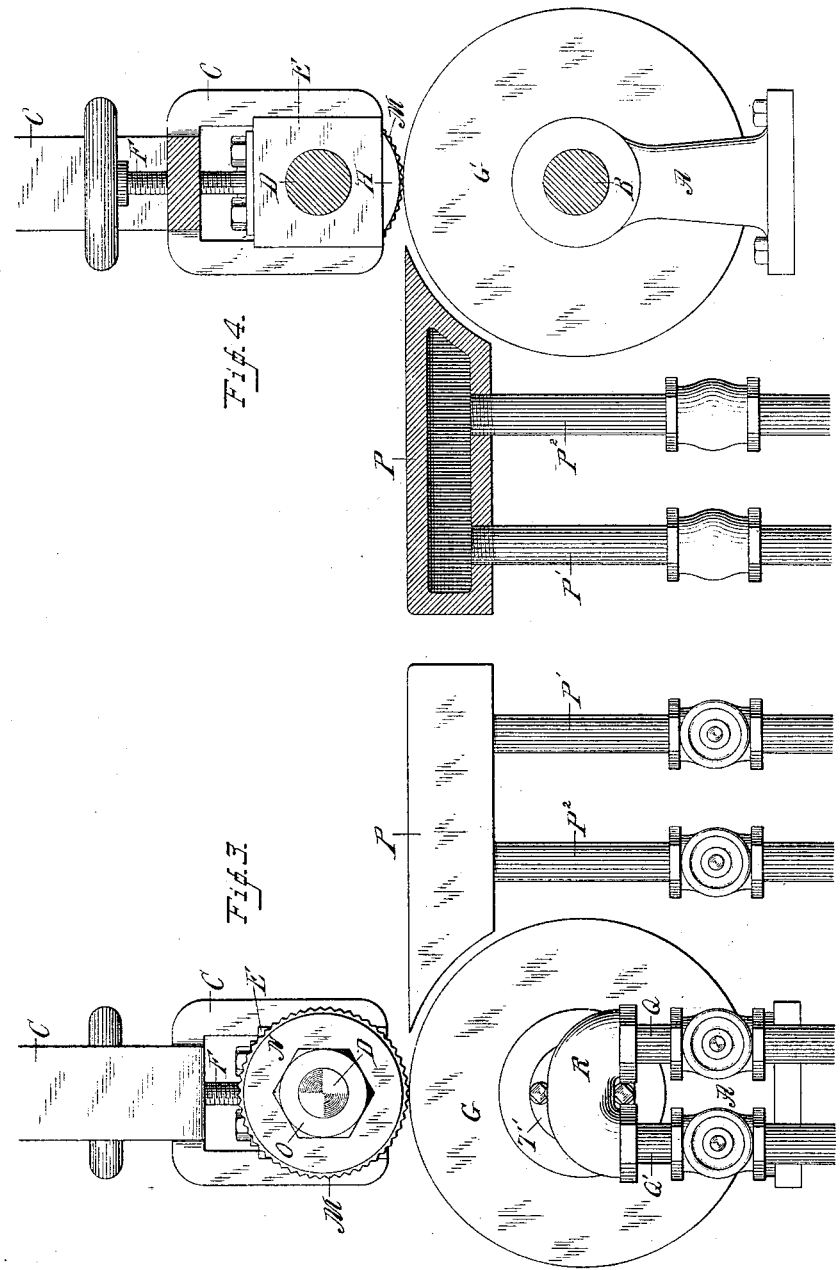

UNITED STATES PATENT OFFICE.

THEODORE HAWLEY, OF FAIRFIELD, CONNECTICUT.

MECHANISM FOR JOINING PIECES OF RUBBER CLOTH.

SPECIFICATION forming part of Letters Patent No. 338,069, dated March 16, 1886.

Application filed December 21, 1885. Serial No. 186,412. (No model.)

*To all whom it may concern:*

Be it known that I, THEODORE HAWLEY, a citizen of the United States, residing at Fairfield, in the county of Fairfield and State of Connecticut, have invented certain new and useful Improvements in Mechanism for Joining Pieces of Rubber Cloth; and I do hereby declare the following to be a full, clear, and exact description of the invention, such as will enable others skilled in the art to which it appertains to make and use the same.

My invention relates more especially to the manufacture of rubber clothing, and has for its object to produce mechanism whereby the several pieces of which rubber garments are composed may be joined together mechanically. By that I mean that hand rolling and pressing are entirely dispensed with in the formation of the seams. I am also enabled to wholly dispense with the use of naphtha and other solvents to soften the edges of the parts before they are laid together.

It will of course be understood that my invention is not limited to the manufacture of rubber clothing, but relates, broadly, to the joining of pieces of rubber cloth. The method which is now in common use, and is, in fact, about the only means for uniting pieces of rubber cloth, is substantially as follows: The edge of one piece is covered upon the back with cement as far from the edge as the proposed width of the seam. The edge is then folded over about one-sixteenth of an inch, the cement of course sticking the fold down. The face of the other piece is then softened with naphtha to about the same distance from the edge as the cement is placed upon the other piece. The first piece is then laid over the second—that is to say, the cemented back of one piece is placed over the softened face of the other piece. The seam is then rolled down hard by a hand-roller, and imitation stitching or any other ornamental appearance is produced by another hand-tool.

As stated above, the object of my invention is to entirely do away with hand-labor, and also with the use of naphtha. This result I accomplish in the manner which I will now proceed to describe, referring by letters to the accompanying drawings, forming part of this specification, in which—

Figure 1 is a side elevation of my novel machine; Fig. 2, a sectional view of the same, portions thereof being in full lines; Fig. 3, an end elevation, and Fig. 4 a section on the line $x\ x$. (See Fig. 1.)

Similar letters denote the same parts in all the figures.

A represents the frame-work, which may rest upon a bench or any suitable support.

B is a shaft journaled in this frame-work.

C represents other frame-work, preferably depending from the ceiling, and D a shaft journaled in blocks E. These blocks are securely held in the frame-work, as shown in Figs. 3 and 4, and are carried by screws F in said frame-work, by means of which they may be raised or lowered to adjust shaft D.

G is a hollow steam-heated roller carried by the lower shaft, and H a cold roller carried by the upper shaft. For convenience in use, I preferably make the upper roller half the diameter of the heated roller. Both shafts are provided at their opposite ends with gear-wheels K, the diameter of the one upon the upper shaft bearing the same relation to the one upon the lower shaft that the diameter of the cold roller bears to the diameter of the heated roller. This is in order that the surface motion of the cold and heated rollers may be the same. Motion is imparted to the rollers by means of a driving-pulley, L, upon one of the shafts, preferably the lower one, as shown.

An important feature of my improved construction is, that I provide an open space, I, between the shafts and extending to the frame-work on opposite sides, both rollers and gears being placed outside of the frame-work. The object of this space is to permit an entire overcoat or carriage-boot to be passed between the shafts.

M represents a toothed disk upon the upper shaft, outside of the cold roller, by which the appearance of stitching is produced at the seam.

N represents washers upon the upper shaft, which I place upon either or both sides of the stitcher as a means of adjusting it to any desired position. The stitchers and washers are held in place upon the shaft by means of a nut, O.

P is a heated table, upon which the work is laid and properly arranged before being passed between the rollers.

P' is a steam-pipe; P², an exhaust-pipe communicating therewith.

Steam may be admitted into the hollow roller to heat it in any suitable manner.

In Fig. 2 I have illustrated a simple and efficient means for heating said roller, which I will briefly describe. Q is the steam-pipe; Q', the exhaust-pipe, both of which communicate with a double elbow, R. The steam from pipe Q enters the compartment R' in part R, and from thence passes through pipe S into the interior of the roller. The exhaust from the roller passes through pipe S', surrounding pipe S, into compartment R² in part R, which communicates directly with exhaust-pipe Q'.

T is a stuffing-box, and T' a gland of ordinary construction.

The essential principle of my invention is, that I form the seam by heating the edge of one of the pieces upon its face sufficiently to soften the gum, and that the parts are rolled together under great pressure.

The manner in which the seam is ordinarily formed is as follows: The pieces are laid upon the table, face to face, and while in this position are passed between the rollers, which are only allowed to bear upon the pieces the width of the seam, the back of the lower piece resting upon the heated roller. The impressions made by the stitcher give the appearance of a stitched seam. The stitcher also assists in uniting the pieces firmly together. After being passed through the machine the upper piece is folded over backward, both pieces being now face upward, and in this position they are passed through a second time, the rollers bearing on the seam, as before. If preferred, a little cement may be placed along the edge of the upper piece before they are passed through the first time, or—as, for example, in the cheaper grades of goods—the two pieces may be stitched together before being passed through the first time, and again, if deemed necessary, before being passed through the second time.

In the higher grades of goods—that is, goods in which the gum is tolerably pure—no cement or stitching need be used; but in the lower grades of goods I preferably stitch the pieces or use cement, in order to increase the strength of the seam. In both instances the use of naphtha is dispensed with; likewise all hand-labor in rolling and ornamenting the seam.

In practice the lower piece of goods is heated upon the table before being passed between the rollers. While passing through the rollers no heat is lost in the lower piece; in fact, the gum upon the upper surface of the lower piece is rendered still softer by the heat of the lower roller. It is of course essential that the upper piece should not be heated sufficiently to soften the gum. I therefore preferably make the upper roller solid, as shown in the drawings. Upon certain grades of goods—as, for example, when the surfaces of the pieces to be joined together are uneven—I shall use an elastic upper or cold roller. It will be understood, of course, that I do not limit myself to any special style of upper roller, the only requisite being that it shall be a cold roller. If preferred, however, water may be passed through in the usual manner in order to keep it cool. The pressure of the upper roller upon the goods is necessarily heavy in all cases, and may be regulated by screws F in accordance with the thickness of the goods upon which the machine is being used.

I do not, of course, desire to limit myself to the details of construction shown and described, as it is obvious that they may be widely varied without departing in the slightest from the spirit of my invention.

Having thus described my invention, I claim—

1. A machine for joining pieces of rubber cloth, consisting, essentially, of a heated table and a heated lower roller, in combination with an adjustable cold upper roller.

2. The heated table and heated lower roller, in combination with an upper roller of less diameter than the lower roller, and gears whose relative diameters correspond with the diameters of the rollers, so that the surface motion of the two rollers is equal.

3. Shafts B and D, carried by frame-work A and C, in combination with a heated roller and a cold roller carried by said shafts, and located outside of the frame-work, and gears at the other ends of said shafts, also outside of the frame-work, whereby an open space, I, is provided, through which garments, &c., may be passed.

4. The table and lower roller having steam and exhaust pipes connected therewith, in combination with a cold upper roller, and means—for example, journal-blocks and screws—for adjusting the upper roller.

5. The table and lower roller having steam and exhaust pipes connected therewith, in combination with an elastic adjustable upper roller, and means—for example, gears of suitable size—whereby motion is imparted by one roller to the other, the surface motion of the two rollers being equal.

6. In a machine for joining pieces of rubber cloth, shaft B, carrying a heated roller, in combination with shaft D, carrying a cold roller, and also a stitcher, whereby the gum upon one piece of cloth is softened without affecting the other piece, the two pieces are firmly pressed together, and an imitation of stitching is produced upon the upper piece, all at a single operation.

In testimony whereof I affix my signature in presence of two witnesses.

THEODORE HAWLEY.

Witnesses:
A. M. WOOSTER,
C. E. RUGGLES.